No. 705,894. Patented July 29, 1902.
D. B. ARNOLD.
DRIVE GEAR FOR TRACTION ENGINES.
(Application filed Oct. 24, 1901.)
(No Model.) 2 Sheets—Sheet 1.
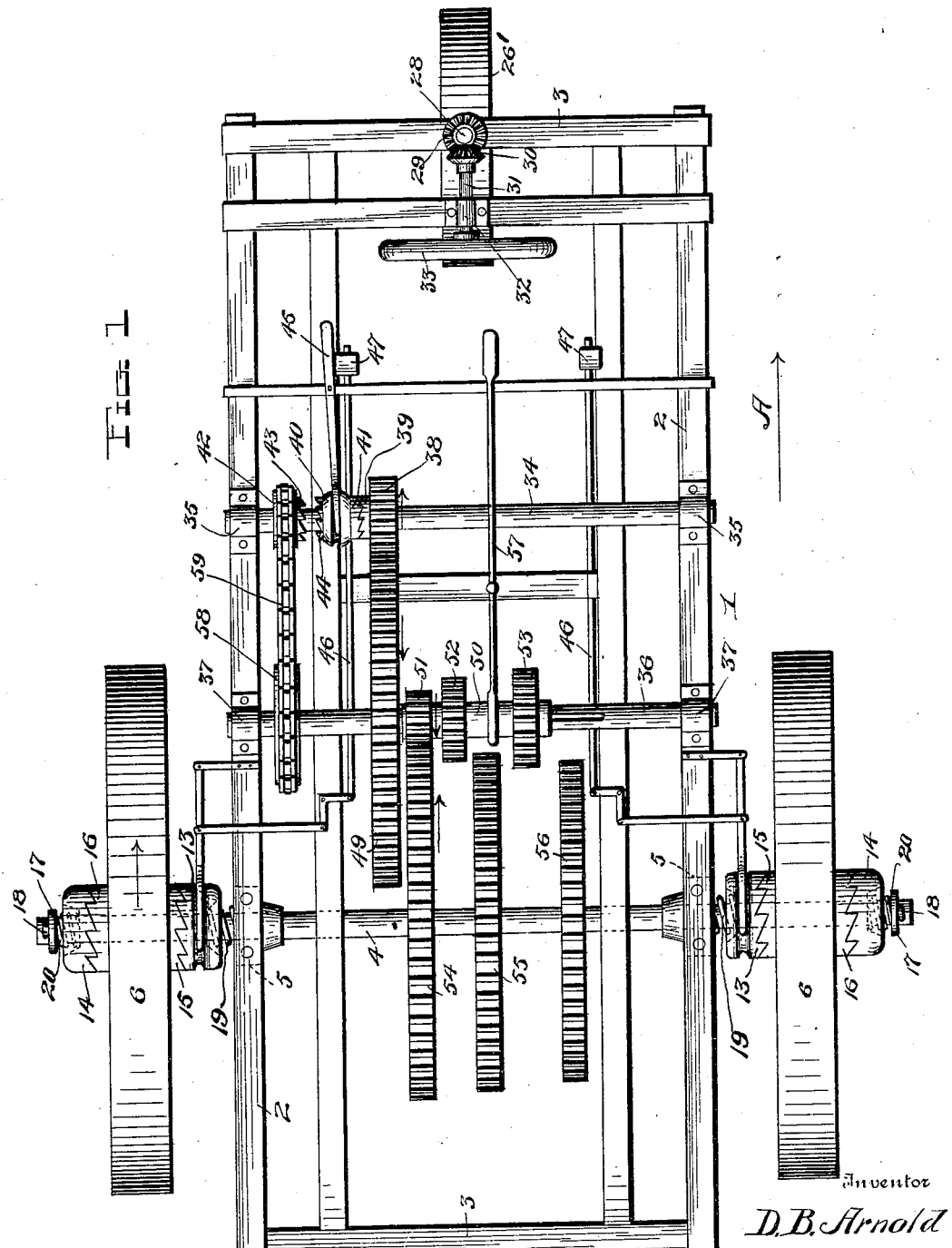
Witnesses
Inventor
D. B. Arnold
By H. B. Willson & Co.
Attorneys No. 705,894. Patented July 29, 1902.
D. B. ARNOLD.
DRIVE GEAR FOR TRACTION ENGINES.
(Application filed Oct. 24, 1901.)
(No Model.) 2 Sheets—Sheet 2.
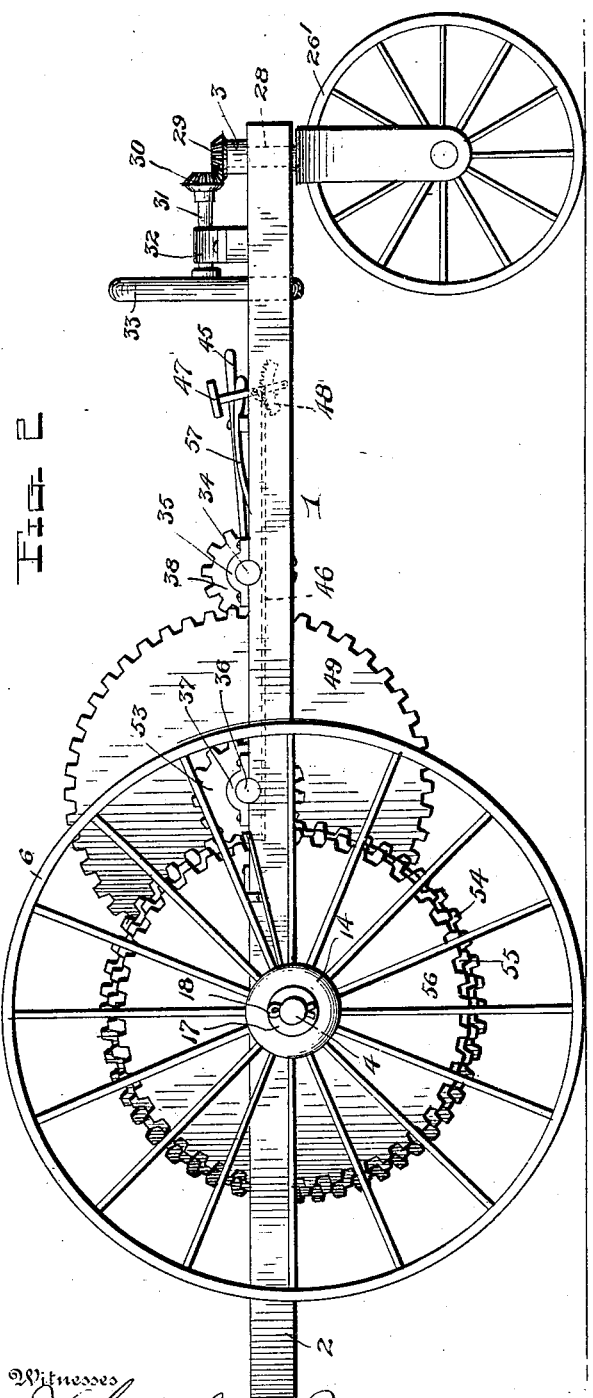
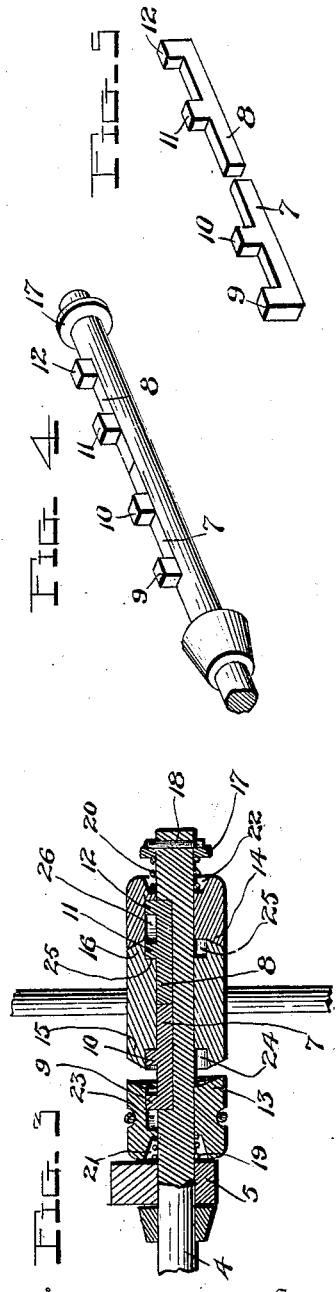
Inventor
D. B. Arnold
Witnesses

UNITED STATES PATENT OFFICE.

DAVID B. ARNOLD, OF TERRE HAUTE, INDIANA.

DRIVE-GEAR FOR TRACTION-ENGINES.

SPECIFICATION forming part of Letters Patent No. 705,894, dated July 29, 1902.

Application filed October 24, 1901. Serial No. 79,831. (No model.)

*To all whom it may concern:*

Be it known that I, DAVID B. ARNOLD, a citizen of the United States, residing at Terre Haute, in the county of Vigo and State of Indiana, have invented certain new and useful Improvements in Drive-Gear for Traction-Engines; and I do declare the following to be a full, clear, and exact description of the invention, such as will enable others skilled in the art to which it appertains to make and use the same.

The invention relates to a driving-gear for traction-engines.

The object of the invention is to provide a driving-gear which shall be simple of construction, durable in use, comparatively inexpensive of production, positive in action, and which may be easily and quickly reversed to drive the machine forward or rearward, as desired.

With these and other objects in view the invention consists of certain novel features of construction, combination, and arrangement of parts, which will be hereinafter more fully described, and particularly pointed out in the appended claims.

In the accompanying drawings, in which I have represented my invention in conventional form, Figure 1 is a top plan view of the supporting-frame of the engine, showing it in skeleton form and illustrating the arrangement of the drive-gears. Fig. 2 is a side view of the same. Fig. 3 is a vertical sectional view through one end of the axle, the hub of the wheel thereon, and through the sliding clutch members arranged at the opposite ends of the hub. Fig. 4 is a detail perspective view of the end of the axle, and Fig. 5 is a detail perspective view of the sections constituting the spline or feather.

Referring to the drawings, 1 denotes the main frame, which comprises in its construction parallel side pieces 2 and the end pieces 3.

4 denotes the axle, journaled in bearings 5, carried by the side pieces of the main frame, and 6 denotes the traction-wheels, loosely journaled upon said axle. The axle at each end is provided with a longitudinal groove in which is placed a spline or feather consisting, preferably, of sections 7 and 8, the former of which is provided with lugs 9 and 10 and the latter of which is provided with lugs 11 and 12.

13 denotes the inner clutch-section mounted upon said axle, and 14 denotes the outer clutch-section mounted upon said axle.

15 denotes a clutch-section integral with the hub of the traction-wheel, and 16 denotes a clutch-section integral with the other side of the hub of the traction-wheel.

17 denotes a washer secured upon the extreme end of the axle, and 18 denotes a cotter-pin for holding the washer in place.

19 denotes a coiled spring confined between the side piece 2 of the frame and the inner clutch member 13, and 20 denotes a coiled spring confined between the washer 17 and the outer clutch member 14, the clutch members 13 and 14 being preferably provided with seats 21 and 22, respectively, for the ends of said springs.

In placing each traction-wheel and clutches on the ends of the axles the spring 19 and the clutch member 13 are first slipped on the axle, and the section 7 of the spline or feather is then inserted in the groove of the axle, so that the lug 9 of the spline enters the groove 23 in the bore of the clutch member 13. This construction allows the said clutch member to have a sliding engagement on the axle, but is required to turn with it. The hub of the wheel is now placed over the axle, and the annular shoulder 24 of the hub abuts against the lug 10. The section 8 of the spline or feather is now inserted in the longitudinal groove of the axle until its end abuts against the inner end of the section 7. In this position the stud 11 of the section 8 of the spline or feather abuts against the annular shoulder 25 of the hub, so that said hub is confined between the lugs 10 and 11 against longitudinal movement on the axle, but is free to rotate. The clutch member 14 is now slipped upon the end of the axle, and its groove 26 is engaged with the lug 12 of the spline or feather, so as to lock said clutch member to rotate with the axle, but to permit it to slide with respect to the same. The spring 20 and the washer 17 are now placed upon the end of the axle, and a cotter-pin or other fastening device is used to hold the washer in place.

26' denotes the front supporting steering-wheel, journaled in the forked ends of the vertical shaft 28, which projects upwardly through the front cross-piece 3 of the main frame and is provided with a beveled gear 29, which meshes with a beveled pinion 30, fixed to the shaft 31, journaled in bearings 32 of the main frame and provided with an operating-wheel 33.

34 denotes the drive-shaft, journaled in bearings 35, secured to the side pieces of the main frame and driven from the engine, which may be suitably supported from the main frame in any desired position thereon.

As the engine and the manner of gearing it to the shaft 34 form no part of the invention, it is not thought necessary to enter into a detailed description of the same.

36 denotes a counter-shaft journaled in bearings 37.

The drive-shaft has loosely mounted thereon a pinion 38, carrying a clutch member 39, and has splined thereon a clutch-head 40, carrying a clutch member 41, adapted to be thrown into operative connection with the clutch member 39. The shaft has also loosely mounted thereon a sprocket-wheel 42, provided with a clutch member 43, and this clutch member 43 is adapted to be operatively connected with the clutch member 44 of the clutch-head 40 when said clutch-head is shifted laterally toward the sprocket-wheel.

45 denotes a clutch-shipper, suitably pivoted to the main frame within convenient reach of the engineer for the purpose of shifting the clutch-head.

46 denotes a clutch-shipper for shifting the clutch-sections 13, which consists of links and levers, which it is not necessary to describe as no specific claim is made for the same. The operating-levers 47 for the clutch-shippers 46 are adapted to engage two segments 48, supported in the main frame for holding the clutch members 13 out of engagement with the clutch members 15. Any other suitable means may be employed for accomplishing this.

49 denotes a gear-wheel fixed to the shaft 36 and adapted to mesh with the gear-wheel 38.

50 denotes a sleeve splined to slide upon and turn with the shaft 36.

51, 52, and 53 denote differential gears, fixed to said sleeve and adapted to be brought into mesh with the differential gears 54, 55, and 56, fixed to the axle 4, whereby speed of the traction-engine may be varied by shifting the sleeve 50 to bring any gear fixed thereto to mesh with any gear of the axle 4. The sleeve 50 may be shifted in any suitable manner, preferably by a lever 57, pivoted to the main frame and within convenient reach of the operator.

58 denotes a sprocket-wheel fixed to the counter-shaft 36 and connected to the sprocket-wheel 42 by a sprocket-chain 59.

In operation, assuming the machine to be traveling in the direction of the arrow A, it will be noticed that the clutch members 41 and 39 are in operative engagement, thus locking the gear 38 to the shaft 34, and said gear meshing with the gear 49 rotates the latter gear, which, being fixed to the shaft 36, rotates said shaft. The differential gear 51 is shown in engagement with the gear 54, and thus as the shaft 36 is rotated the gear 54 will be rotated by the gear 51 in the direction of the arrow placed thereon, thus rotating the axle 4 and driving the traction-wheels 6 in the direction of the arrow placed thereon. The clutch members 15 on the wheels 6 are engaged with the clutch members 13, which are keyed to the axles, so that the said wheels 6 must turn with the axle 4. The clutch members 14 are also engaged with the clutches 16 on the wheels; but as the teeth of the clutches 14 are pointed in the reverse direction to those on the drive-clutches 13 the clutches 14 do not act as drivers, but simply turn with the wheels because they are keyed to the axle 4, and the springs 20 hold them in engagement with the clutches 16. Should it be desired to turn the machine—say to the right—the clutch member 13 on the right side of the machine is disengaged from its coacting clutch 15 by operating the clutch-shipper 46 by means of the lever 47. This allows the wheel 6 on the right of the machine to act as a pivot-wheel, while the wheel on the opposite side does the driving. If it be desired to turn the machine in the opposite direction, then the clutch 13 on the left side of the machine is disengaged to allow the wheel on that side to act as a pivot, and the clutch 13 on the right side of the machine engages the clutch 15 on the wheel and drives it forward. Should it be desired to reverse the direction of movement of the engine, the shipper 45 is operated to throw the clutch member 41 out of engagement with the clutch member 39 and simultaneously throw the clutch member 44 into engagement with the clutch member 43, thus locking the wheel 42 to the drive-shaft 34, and as this sprocket-wheel 42 is connected to the sprocket-wheel 58 by the sprocket-chain 59 the counter-shaft 36 will be rotated in the direction reverse to that when it is driven by the gear 38. When the machine moves rearwardly, the clutch members 14 act as the driving-clutches, while the clutch members 13 simply rotate with the axle and do not assist in driving the wheels rearwardly. It will thus be seen that the direction of movement may be reversed without reversing the engine.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what

I claim, and desire to secure by Letters Patent, is—

1. The combination with the supporting-frame; of a steering-wheel located at one end thereof, traction-wheels loosely journaled upon the axles of the supporting-frame and provided with clutch members at the opposite ends of their hubs, clutch members located at each end of the axle and locked to rotate therewith and slide longitudinally thereon, springs for holding said clutch members into engagement with the clutches on the outer ends of the hubs, clutch members located upon the axles adjacent to the inner ends of the hubs and locked to rotate therewith and slide thereon and adapted to engage the clutch members at the inner ends of the hubs, and means for shifting the last-named sliding clutch members, substantially as described.

2. The combination with the supporting-frame; of an axle journaled in said supporting-frame and provided at each end with two clutch members keyed to rotate with the axle and slide thereon, traction-wheels loosely journaled upon said axle and each provided with a clutch member at each end of its hub, springs for holding the sliding clutch members into locked engagement with the outer clutch members of the hubs, a second set of clutch members keyed to rotate with and slide upon the axle and located to engage the clutch members on the inner ends of the axles, the teeth of the inner set of sliding clutch members being pitched in one direction and the teeth of the outer set being pitched in an opposite direction, and means for shifting the inner set of clutch members, substantially as specified.

3. The combination with the supporting-frame of a traction-engine; of an axle having a groove at its end, a two-part spline or feather fitted in said groove and provided with lugs, a clutch member having a groove to engage one of said lugs to cause the clutch member to turn with the spline or feather in the rotation of the axle, a traction-wheel located between two of the lugs of the spline or feather and free to rotate therebetween but prevented from having endwise movement on the axle, a second clutch member mounted on the axle and having a groove engaging the outermost lug to lock said clutch member to rotate with said axle but to permit it to have a sliding movement thereon, the hub of said wheel being provided with clutch members to be engaged by the aforesaid clutch members, substantially as set forth.

4. The combination with the supporting-frame of a traction-engine; of a steering-wheel and traction-wheels, clutch devices for locking the traction-wheels to said axle to turn in either direction of movement of said axle, differential gear-wheels fixed to said axle, a drive-shaft, a sprocket-wheel and a gear-wheel loosely mounted upon said drive-shaft, clutch members splined upon said drive-shaft to lock either the gear-wheel or the sprocket-wheel to rotate the said drive-shaft, a counter-shaft suitably mounted in the main frame and provided with differential gear-wheels to engage the differential gear-wheels aforesaid, a gear-wheel fixed to said counter-shaft and adapted to mesh with the gear-wheel on the drive-shaft, a sprocket-wheel fixed to the counter-shaft and connected to the sprocket-wheel of the drive-shaft by a chain and adapted to rotate the counter-shaft in a direction reverse to that when the gear-wheel is in mesh with the fixed gear-wheel on the counter-shaft, and means for shifting the several clutch members, substantially in the manner described.

In testimony whereof I have hereunto set my hand in presence of two subscribing witnesses.

DAVID B. ARNOLD.

Witnesses:
WILLIAM LEE PARRISH,
CHARLES L. JONES.